Patented Mar. 13, 1934

1,950,850

UNITED STATES PATENT OFFICE 1,950,850

NEW DERIVATIVES OF HIGHER ALIPHATIC HYDROCARBONS CONTAINING SULPHUR AND PROCESS OF MAKING SAME

Karl Keller, Frankfort-on-the-Main-Fechenheim, Germany, assignor to General Aniline Works, Inc., New York, N. Y., a corporation of Delaware No Drawing. Application October 10, 1930, Serial No. 487,910. In Germany February 19, 1930

12 Claims. (Cl. 260—17)

My present invention relates to new derivatives of higher aliphatic hydrocarbons containing sulphur and process of making same.

I have found that groups containing sulphur can be introduced into derivatives of technical mixtures representing liquid and solid paraffins containing more than 3 carbon atoms and at least one grouping allowing the entrance of sulphur containing groups, i. e. polyhalogenated derivatives of technical mixtures representing liquid or solid paraffins containing at least two halogen atoms per average molecule or their hydroxylated or nitrogenous unsaturated conversion products by treating same with a sulphurizing agent selected from the group consisting of sulphur, hydrogen-sulphide, hydrosulphides, sulphides and polysulphides.

Said conversion products are obtained by the action of ammonia or an agent yielding ammonia or of alkalies or alkaline acting agents on polyhalogenated derivatives of liquid or solid paraffin hydrocarbons. They are suitable for my present process, so far as they still contain replaceable halogen atoms or double bonds. When using such starting materials the basic nitrogenous and hydroxyl groups are found unchanged in the final products.

The process of sulphurizing may be carried out with or without the addition of a solvent such as water, alcohols, or cyclic alcohols. Preferably the components are heated together advantageously under elevated pressure. The sulphurizing agents may be used alone or in admixture one with another, or one after another.

According to the conditions applied the double bonds are entirely or partly saturated by the entrance of the sulphurizing agents, or the halogen atoms are entirely or partly replaced by the sulphurizing agents. Apparently in this manner sulphur atoms and mercapto groups and perhaps in some cases also hydroxyl-groups are introduced into the molecule.

When using halogenated compounds the halogen atoms are in part split off with the formation of hydrogen halide and new double bonds. When using starting materials containing double bonds as well as the halogen atoms the groups containing sulphur are introduced into the molecule by saturation of the double bonds as well as by replacement of the halogen atoms.

The new products obtained according to the present invention contain sulphur, they have a mercaptan or sulphide like character; they form for the most part light more or less colored viscous oils, partly soluble in dilute alkalies, partly insoluble therein. They are scarcely soluble in alcohols, more soluble in ether, trichlorethylene and other solvents.

In order to further illustrate my invention the following examples are given, the parts being by weight and all temperatures in centigrade degrees. But I wish it to be understood that I am not limited to the particular conditions nor specific products mentioned therein.

Example 1

33 parts of the strongly unsaturated product obtained by treating tetrachloro hard paraffin (obtained by chlorinating hard paraffin of melting point 56–58° C. until the entrance of about 4 chlorine atoms calculated for an average molecular weight of 367) with an alcoholic potassium hydroxide solution and which hydroxylated product is free from chlorine are heated with a solution of 25 parts of sodium tetrasulphide in about 160 parts of cyclohexanol while stirring for some hours at 150–160° in an autoclave. When cool the cyclohexanol is distilled off and the residue is washed with water and dried. It forms a brown viscous oil containing about two sulphur atoms in the molecule.

Example 2

66 parts of the unsaturated product obtained by treating trichlorinated hard paraffin (obtained by chlorinating said hard paraffin until the entrance of about 3 chlorine atoms calculated for an average molecular weight of 367) with an alcoholic potassium hydroxide solution and which hydroxylated product is free from chlorine are heated with 13 parts of sulphur for about 2 hours while stirring at about 200–210° in an oil bath. During this time the sulphur has entirely entered into the molecule of the initial product. The new product represents a brown very viscous oil containing according to analysis about 2 atoms of sulphur in its average molecule.

Example 3

107 parts of a trichlorinated paraffin obtained by introducing 26 parts of chloride into 81 parts of hard paraffin, are heated for about 4 hours in an autoclave at 140–145° with a solution of 46 parts of caustic potash in 250 parts of alcohol, saturated with hydrogen sulphide. When cool the alcohol is distilled off and the remaining mixture of oil and salt is washed with water. The oil thus obtained may be purified by filtration or by dissolving it in a suitable organic solvent, dehydrating the solution and removing the solvent by distillation. A light yellow product free from chlorine of a salve-like consistency is obtained. The new product is of an unsaturated character and contains apparently two SH-groups in the average molecule.

*Example 4*

53.5 parts of the starting material of Example 3 are mixed with a solution of 30 parts of potassium hydrosulphide in about 150 parts of water and the mixture is heated for about 5 hours in an autoclave while stirring at 140-145°. When cool the oil thus obtained is separated from the alkaline salt solution, washed and dried. It represents a brownish oil of an unsaturated character containing but a small amount of sulphur.

When acidifying the alkaline solution from which the main product has been separated a further more sulphurized oil of a feebly unsaturated character is obtained containing according to analysis about 3 SH-groups in its average molecule and being easily soluble in dilute alkaline solutions.

*Example 5*

55 parts of a chlorinated product, obtained by introducing 25 parts of chlorine into 30 parts of soft paraffin and which product contains about 7 atoms of chlorine calculated on the average molecular weight, are heated in an autoclave with a mixture of 42 parts of sodium hydrosulphide and 175 parts of methylalcohol for about 7 hours at 120-130°. When cool the methylalcohol is distilled off and the remaining oil is washed with water and dried. In this manner a light strongly viscous oil of a strong unsaturated character is obtained, which contains about 3 SH-groups in its average molecule and is free from chlorine.

When heating 43 parts of the product thus obtained with 3.5 parts of sulphur in an oil bath while stirring at about 180-200° for about 1-2 hours a light brown elastic product is obtained which contains about 1 sulphur atom more than the initial product.

*Example 6*

80.5 parts of a chlorinated paraffin obtained by introducing 31.5 parts of chlorine into 49 parts of hard paraffin and which product contains 6 atoms of chlorine calculated on the average molecular weight are heated in an autoclave with a solution of 250 parts of crystallized sodium sulphide in about 250 parts of water at 220-225° for about 5 hours while stirring. When cool the reaction product is separated from the salt solution, washed and dried. The new product represents a brownish viscous oil of an unsaturated character. As proved by analysis it contains still about 1 chlorine atom and nearly 2 hydroxyl groups and about 1 sulphur atom in its average molecule calculated upon 2 molecules of the starting material. Similar products are obtained when increasing the reaction temperature to about 250°.

When heating the reaction product thus obtained for 2-3 hours with a solution of 12 parts of potassium hydrosulphide in about 150 parts of alcohol in an autoclave at 130-140°, removing the alcohol by distillation, isolating the reaction product from the remaining mixture of oil and salt by filtration and purifying it in a suitable manner a brownish viscous oil of an unsaturated character is obtained which contains about 2 sulphur atoms in its average molecule and is free from chlorine.

A similar product is obtained when mixing the reaction mass obtained according to paragraph 1 of this example without isolating the reaction product with 12 parts of potassium hydrosulphide and heating again the mixture in the autoclave for 3-4 hours at about 175-180°.

*Example 7*

72 parts of a chlorinated product, obtained by introducing 35 parts of chlorine into 37 parts of paraffin oil, are heated with a mixture of 80 parts of sodium tetrasulphide with about 250 parts of alcohol and 250 parts of water for some hours in an autoclave while stirring at 200-210°. When cool the oil thus obtained is separated from the hydrochloric acid and washed. It may be purified by redissolving it in an organic solvent. The new reaction product represents an unsaturated thinly liquid oil containing chlorine and sulphur. By further decomposition reaction it may be converted into new valuable products.

A similar result is obtained when carrying out the sulphurizing process by heating for some hours at 170-180° in an oil bath with the same quantity of finely powdered sodium tetrasulphide but without addition of a diluent.

The reaction runs particularly smoothly when heating the same quantity of the initial product with a mixture of 50 parts of sodium tetrasulphide and 40 parts of potassium hydrosulphide with addition of about 300 parts of alcohol for some hours in an autoclave while stirring at about 180-190°.

*Example 8*

37.5 parts of the product, obtained by treating trichlorinated soft paraffin with a caustic soda solution and which product is hydroxylated and contains about one chlorine atom and one double bond per average molecule, are heated with 3.5 parts of sulphur in an oil bath for about 2 hours at 190-200° while stirring. A brown viscous oil is obtained containing according to analysis still chlorine and about one sulphur atom in the average molecule.

*Example 9*

75 parts of the initial product used in the foregoing example are heated with a solution of 15 parts of potassium hydrosulphide in about 150 parts of alcohol in an autoclave at about 150° for 2-3 hours.

Then the reaction mass containing the alcoholic solution of the reaction product representing an unsaturated oil formed by replacing chlorine by the mercapto group is mixed again with 14 parts of finely powdered sodium tetrasulphide and the mixture is heated for some hours at about 150-160° in an autoclave while stirring. When cool the alcohol is distilled off, the residue is washed with water and the oil thus obtained is dried in vacuo. The new compound contains in its average molecule about double the quantity of sulphur compared with the above mentioned product obtained by the reaction of potassium hydrosulphide.

*Example 10*

40 parts of the product obtained by heating hexachlorinated hard paraffin with a solution of ammonia in methanol and which product contains about two basic nitrogenous groups, one double bond, and two chlorine atoms per average molecule, are mixed with a solution of 20 parts of caustic potash in about 180 parts of ethylalcohol, which has been saturated with hydrogen sulphide, and the mixture is heated in an autoclave at 130-140° for about 3 hours. When cool the alcohol is distilled off and the remaining oil is washed with water and dried. The reaction product thus obtained is more unsaturated than the initial product. It is free from chlorine and contains besides the two unchanged basic nitrogenous groups about one SH-group in its average molecule.

The reaction may be carried out with a similar result by heating the components at temperatures only a little over 100°.

Example 11

40 parts of the initial product used in the foregoing example are heated with a solution of 34 parts of sodium tetrasulphide in about 180 parts of cyclohexanol for some hours in an autoclave while stirring at 130-140°. When cool the cyclohexanol is distilled off, the residue is washed with water, purified by redissolving it in alcohol and dried. The brown oil thus obtained contains according to analysis nearly 3 sulphur atoms introduced into the average molecule by replacing the chlorine atoms of the initial product by mercapto groups as well as by adding sulphur to the double bond of the starting material. The nitrogenous groups remain unchanged. Therefore the reaction product is easily soluble in dilute acids.

Example 12

47 parts of the hydroxylated product obtained by heating hepta chlorinated hard paraffin with an aqueous solution of potassium carbonate and which product still contains about 4 chlorine atoms per average molecule are heated with a solution of 25 parts of caustic soda in about 200 parts of ethylalcohol, which has been saturated with hydrogen sulphide, in an autoclave for some hours at 145-150°. When cool the alcohol is distilled off and the remaining oil is freed from salt by washing with water. A brownish yellow oil is then obtained of more unsaturated character than the initial product. The new product is free from chlorine and contains besides the unchanged hydroxyl groups about 2 SH-groups in its average molecule.

Example 13

37 parts of the hydroxylated product obtained by heating trichlorinated hard paraffin with a caustic soda solution and which product still contains about 1 chlorine atom in its average molecule, are heated with a solution of 17 parts of anhydrous sodium sulphide in about 110 parts of alcohol for about 4 hours in an autoclave at 140-150°. The reaction product represents a brownish viscous oil, free from chlorine containing about one sulphur atom in its average molecule.

Example 14

43 parts of trichlorinated hard paraffin are heated with 10 parts of sulphur for some hours in the oil bath at about 180-190° while stirring. The reaction mass is dissolved in alcohol and separated from unchanged sulphur by filtration and then the alcohol is distilled off. The reaction product represents a brownish viscous oil containing about one sulphur atom in its average molecule.

I claim:—

1. A process for producing derivatives of higher aliphatic hydrocarbons containing sulphur which process comprises heating a derivative of a technical mixture of paraffin hydrocarbons, said hydrocarbon derivative containing more than 8 carbon atoms and at least one atomic grouping per average molecule allowing the entrance of sulphur-containing groups, which derivative contains at least one substituent selected from the group consisting of halogen atoms, hydroxyl- and basic nitrogenous-groups at temperatures ranging from 100° to 250° with a sulphurizing agent selected from the group consisting of sulphur, hydrogen sulphide, hydrosulphides, sulphides and polysulphides.

2. A process for producing derivatives of higher aliphatic hydrocarbons containing sulphur which process comprises heating a derivative of a technical mixture of paraffin hydrocarbons, said hydrocarbon derivative containing more than 8 carbon atoms and at least one double bond per average molecule, which hydrocarbon derivative contains at least one substituent selected from the group consisting of hydroxyl- and basic nitrogenous groups, at temperatures from 100° to 250° with a sulphurizing agent selected from the group consisting of sulphur, hydrogen sulphide, hydrosulphides, sulphides and polysulphides.

3. A process for producing derivatives of higher aliphatic hydrocarbons containing sulphur which process comprises heating a derivative of a technical mixture of paraffin hydrocarbons, said hydrocarbon derivative containing more than 8 carbon atoms and at least two halogen atoms per average molecule, which hydrocarbon derivative may contain at least one substituent selected from the group consisting of hydroxyl- and basic nitrogenous groups, at temperatures ranging from 100° to 250° with a sulphurizing agent selected from the group consisting of sulphur, hydrogen sulphide, hydrosulphides, sulphides and polysulphides.

4. A process for producing derivatives of higher aliphatic hydrocarbons containing sulphur which process comprises heating a derivative of a technical mixture of paraffin hydrocarbons, said hydrocarbon derivative containing more than 8 carbon atoms and at least two halogen atoms per average molecule at temperatures ranging from 100° to 250° with a sulphurizing agent selected from the group consisting of sulphur, hydrogen sulphide, hydrosulphides, sulphides and polysulphides.

5. A process for producing derivatives of higher aliphatic hydrocarbons containing sulphur which process comprises heating a derivative of a technical mixture of paraffin hydrocarbons, said hydrocarbon derivative containing more than 8 carbon atoms and at least two halogen atoms per average molecule at temperatures ranging from 100° to 250° with an alkali hydrosulphide solution.

6. A process for producing derivatives of higher aliphatic hydrocarbons containing sulphur which process comprises heating a polychlorinated hard paraffin at temperatures ranging from 100° to 250° with an alkali hydrosulphide solution.

7. The derivatives of higher aliphatic hydrocarbons containing sulphur in the form of substituents selected from the group consisting of mercaptan and sulphide groups, forming for the most part light more or less colored viscous oils, partly soluble in dilute alkalies, scarcely soluble in alcohols, more soluble in ether, trichloroethylene and other solvents, which products are obtainable by heating a derivative of a technical mixture of paraffin hydrocarbons, said hydrocarbon derivative containing more than 8 carbon atoms and at least one atomic grouping per average molecule allowing the entrance of sulphur containing groups, which hydrocarbon derivative contains at least one substituent selected from the group consisting of hydroxyl- and basic nitrogenous groups, at temperatures ranging from 100° to 250° with a sulphurizing agent selected from the group consisting of sulphur, hydrogen sulphide, hydrosulphides, sulphides and polysulphides.

8. The derivatives of higher aliphatic hydrocarbons containing sulphur in the form of substituents selected from the group consisting of mercaptan and sulphide groups, forming for the most part light more or less colored viscous oils, partly soluble in dilute alkalies, scarcely soluble in alcohols, more soluble in ether, trichloroethylene and other solvents, which products are obtainable by heating a derivative of a technical mixture of paraffin hydrocarbons, said hydrocarbon derivative containing more than 8 carbon atoms and at least one double bond per average molecule, which hydrocarbon derivative contains at least one substituent selected from the group consisting of hydroxyl- and basic nitrogenous groups, at temperatures ranging from 100° to 250° with a sulphurizing agent selected from the group consisting of sulphur, hydrogen sulphide, hydrosulphides, sulphides and polysulphides.

9. The derivatives of higher aliphatic hydrocarbons containing sulphur in the form of substituents selected from the group consisting of mercaptan and sulphide groups, forming for the most part light more or less colored viscous oils, partly soluble in dilute alkalies, scarcely soluble in alcohols, more soluble in ether, trichloroethylene and other solvents, which products are obtainable by heating a derivative of a technical mixture of paraffin hydrocarbons, said hydrocarbon derivative containing more than 8 carbon atoms and at least two halogen atoms per average molecule, which hydrocarbon derivative may contain at least one substituent selected from the group consisting of hydroxyl- and basic nitrogenous groups, at temperatures ranging from 100° to 250° with a sulphurizing agent selected from the group consisting of sulphur, hydrogen sulphide, hydrosulphides, sulphides and polysulphides.

10. The derivatives of higher aliphatic hydrocarbons containing sulphur in the form of substituents selected from the group consisting of mercaptan and sulphide groups, forming for the most part light more or less colored viscous oils, partly soluble in dilute alkalies, scarcely soluble in alcohols, more soluble in ether, trichloroethylene and other solvents, which products are obtainable by heating a derivative of a technical mixture of paraffin hydrocarbons, said hydrocarbon derivative containing more than 8 carbon atoms and at least two halogen atoms per average molecule at temperatures ranging from 100° to 250° with a sulphurizing agent selected from the group consisting of sulphur, hydrogen sulphide, hydrosulphides, sulphides and polysulphides.

11. The derivatives of higher aliphatic hydrocarbons containing sulphur in the form of substituents selected from the group consisting of mercaptan and sulphide groups, forming for the most part light more or less colored viscous oils, partly soluble in dilute alkalies, scarcely soluble in alcohols, more soluble in ether, trichloroethylene and other solvents, which products are obtainable by heating a derivative of a technical mixture of paraffin hydrocarbons, said hydrocarbon derivative containing more than 8 carbon atoms and at least two halogen atoms per average molecule at temperatures ranging from 100° to 250° with an alkali hydrosulphide solution.

12. The derivatives of higher aliphatic hydrocarbons containing sulphur in the form of substituents selected from the group consisting of mercaptan and sulphide groups, forming for the most part light more or less colored viscous oils, partly soluble in dilute alkalies, scarcely soluble in alcohols, more soluble in ether, trichloroethylene and other solvents, which products are obtainable by heating a polychlorinated hard paraffin at temperatures ranging from 100° to 250° with an alkali hydrosulphide solution.

KARL KELLER.